United States Patent
Mingus, III et al.

(10) Patent No.: US 9,866,769 B2
(45) Date of Patent: Jan. 9, 2018

(54) NANO-IMAGING DEVICE AND SYSTEMS AND METHODS FOR IMPLEMENTING AND USING SAME

(71) Applicant: Charles Mingus, III, New York, NY (US)

(72) Inventors: Charles Mingus, III, New York, NY (US); Matt Aldissi, Belleair Beach, FL (US)

(73) Assignee: Charles Mingus, III, New York, NY (US)

( * ) Notice: Subject to any disclaimer, the term of this patent is extended or adjusted under 35 U.S.C. 154(b) by 0 days.

(21) Appl. No.: 15/083,218

(22) Filed: Mar. 28, 2016

(65) Prior Publication Data
US 2017/0280067 A1    Sep. 28, 2017

(51) Int. Cl.
*H04N 5/33* (2006.01)
*G02C 7/04* (2006.01)
*B82Y 20/00* (2011.01)

(52) U.S. Cl.
CPC .............. *H04N 5/332* (2013.01); *G02C 7/04* (2013.01); *B82Y 20/00* (2013.01)

(58) Field of Classification Search
CPC ........... H04N 5/332; B82Y 20/00; G02C 7/04
See application file for complete search history.

(56) References Cited

U.S. PATENT DOCUMENTS

| | | | | |
|---|---|---|---|---|
| 4,389,788 A | * | 6/1983 | Balogh | G01B 5/08 33/555.1 |
| 7,375,400 B2 | * | 5/2008 | Itoh | G09G 3/22 257/10 |
| 7,381,953 B1 | * | 6/2008 | Kaufman | H01L 25/167 250/332 |
| 7,427,850 B2 | * | 9/2008 | Soyer | G01R 31/3648 320/128 |
| 8,350,360 B1 | * | 1/2013 | Ngo | H01G 4/005 257/532 |
| 8,444,264 B1 | * | 5/2013 | Kross | G02C 5/00 351/41 |

(Continued)

FOREIGN PATENT DOCUMENTS

DE     102013106426 A1 * 12/2014 ............ C07F 9/5045

*Primary Examiner* — Christine Sung (57) ABSTRACT

An imaging device configured to convert a first electromagnetic emission or spectrum to a second electromagnetic emission or spectrum is provided. In accordance with one aspect of the invention, the imaging device comprises an electromagnetic spectrum detector configured from a nanomaterial and operable to receive the first electromagnetic emission or spectrum and generate a voltage based at least in part on the received first electromagnetic emission or spectrum. The imaging device further comprises a capacitor, configured from a nanomaterial and operable to receive the generated voltage from the detector, store the voltage or charge for a brief period of time, and then release the stored voltage or charge. The imaging device further comprises an electromagnetic emission or spectrum emitter configured from a nanomaterial and operable to receive the stored and released charge or voltage from the capacitor and generate the second electromagnetic emission or spectrum in response to the charge or voltage received from the capacitor.

24 Claims, 3 Drawing Sheets

(56) References Cited

U.S. PATENT DOCUMENTS

| | | | |
|---|---|---|---|
| 8,963,104 B2* | 2/2015 | Harding | C08K 5/29 |
| | | | 250/458.1 |
| 9,082,922 B2* | 7/2015 | Ban | H01L 27/3227 |
| 2013/0206988 A1* | 8/2013 | So | H01L 27/288 |
| | | | 250/330 |
| 2016/0325112 A1* | 11/2016 | Zweig | A61N 5/0601 |

* cited by examiner

NANO-IMAGING DEVICE AND SYSTEMS AND METHODS FOR IMPLEMENTING AND USING SAME

CROSS REFERENCE TO RELATED APPLICATIONS

This application claims priority from U.S. Provisional Application No. 62/109,581, filed Jan. 29, 2015, by Charles Mingus, III, et al., and entitled "Nano-Imaging Device and Systems and Methods for Implementing and Using Same."

BACKGROUND OF THE INVENTION

Devices to convert non-visible light spectrum, such as infrared, near-infrared and ultraviolet light have been around for years. Many of these devices are can be bulky and require external energy sources to help convert the spectrum. For example, night vision goggles convert infrared spectrum to a visible form, so people can see objects at night. Currently, these devices are quite large, expensive and require an energy sources, such a battery supply. In addition, modern digital camera technology can also be configured to "see" or detect non-visible light forms, but again these devices tend to be large and require external battery sources.

In addition to electronic devices configured to detect electromagnetic spectrum, certain nanomaterials have been developed that can detect electromagnetic spectrum, such as photo detectors, and the like. These nanomaterials can be polymer or non-polymer based materials. Similarly, certain nanomaterials have been developed that can emit electromagnetic spectrum when a voltage or charge is applied. For example, organic light emitting diodes (OLEDs) are one such device type, which are currently used is display technologies.

To date, however, these nanomaterial devices have not been used or configured in such a way so as to create devices that can receive one electromagnetic spectrum and convert that spectrum to a different spectrum for different practical uses, such as, for example, small, no- or low-power visual aid devices. Thus, what is needed is structures, devices and methods that can be configured into useful imaging and/or data processing devices.

SUMMARY OF THE INVENTION

An imaging device configured to convert a first electromagnetic emission or spectrum to a second electromagnetic emission or spectrum is provided. In accordance with one aspect of the invention, the imaging device comprises an electromagnetic spectrum detector configured from a nanomaterial and operable to receive the first electromagnetic emission or spectrum and generate a voltage based at least in part on the received first electromagnetic emission or spectrum. The imaging device further comprises a capacitor, configured from a nanomaterial and operable to receive the generated voltage from the detector, store the voltage or charge for a brief period of time, and then release the stored voltage or charge. The imaging device further comprises an electromagnetic emission or spectrum emitter configured from a nanomaterial and operable to receive the stored and released charge or voltage from the capacitor and generate the second electromagnetic emission or spectrum in response to the charge or voltage received from the capacitor.

In some embodiments, the imaging device is configured to covert infrared or near-infrared spectrum to visible light spectrum. In other embodiments, the imaging device is configured to convert ultraviolet spectrum to visible light spectrum. In still other embodiments, the imaging device can convert any electromagnetic spectrum to a different spectrum, depending on the required application of the device.

In some embodiments, the detector, capacitor and emitter are formed from a transparent, flexible polymer material. In other embodiments, non-polymer materials can be used. In some embodiments, the detector, capacitor and emitter can be conical shaped. In accordance with this aspect of the invention, the imaging device can be formed by configuring the conical-shaped detector, capacitor and emitter within each other, with the capacitor configured within the emitter, and the detector configured within the capacitor. Thus, electromagnetic emissions or spectrum are received on the inner portion or surface of the conical-shaped imaging device, and electromagnet emissions or spectrum are emitted out of the outer portion or surface of the conical-shaped imaging device. In still other embodiments, the position of the conical-shaped detector and emitter can be reversed. That is, in accordance with this aspect of the invention, the imaging device can be formed with the capacitor configured within the detector, and the emitter configured with in the capacitor. Thus, electromagnetic emissions or spectrum are received on the outer portion or surface of the conical-shaped imaging device by the detector, and electromagnet emissions or spectrum are emitted out from the inner portion or surface of the conical-shaped imaging device by the emitter.

In other embodiments of the invention, an imaging device configured to convert a first electromagnetic emission or spectrum to a second electromagnetic emission or spectrum is provided. In accordance with this embodiment of the invention, the imaging device comprises an array of imaging structures, each comprising (i) an electromagnetic spectrum detector configured from a nanomaterial and operable to receive the first electromagnetic emission or spectrum and generate a voltage based at least in part on the received first electromagnetic emission or spectrum, (ii) a capacitor, configured from a nanomaterial and operable to receive the generated voltage from the detector, store the voltage or charge for a brief period of time, and then release the stored voltage or charge, and (iii) electromagnetic emission or spectrum emitter configured from a nanomaterial and operable to receive the stored and released charge or voltage from the capacitor and generate the second electromagnetic emission or spectrum in response to the charge or voltage received from the capacitor.

In accordance with one aspect of the invention, each of the imaging structures are conical-shaped devices and can be formed from transparent, flexible polymer materials. In other embodiments, non-polymer materials can be used. In one embodiment of the invention, the array of imaging structures is formed by interleaving upward-facing and downward-facing conical-shaped imaging structures in an alternating pattern. Further, the upward-facing and downward-facing imaging structures can be held together by a dielectric material disposed between of the structures. In other embodiments, a transparent dielectric material can be placed on the outside of the array, thus holding the imaging structures in place. In accordance with one aspect of the invention, the upward-facing conical-shaped imaging structures are configured to receive the first electromagnetic emission or spectrum and convert it to an intermediate electromagnetic emission or spectrum. The downward-facing conical-shaped imaging structures are configured to receive the intermediate electromagnetic spectrum from the upward-facing imaging structures and convert it to the second electromagnetic emission or spectrum.

In one embodiment, the array of nano-imaging structures is configured to form a contact lens device. Accordingly, the contact lens device can be used to convert infrared or near-infrared spectrum to visible light, thus creating a night vision contact lens device. Of course, the contact lens also can be configured to convert other electromagnetic spectrums, such as ultraviolet or the like.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF SPECIFIC EMBODIMENTS

The present invention relates to a nano-pixel imaging device or structure that can be configured to convert one form or portion of the electromagnetic (EM) spectrum to another form or portion. For example, the nano-pixel device can be configured to convert IR spectrum to white light (visible light) or UV, or from white light to IR, UV, or an enhanced white light output, etc.

In one embodiment, the nano-pixel structure is a transparent or semi-transparent, flexible tri-layer device comprising three superimposed and electrically inter-connected devices or components. The outer-most device or component is a nano-pixel detector for detecting EM spectrum emissions and then generating an electrical current based upon the detected spectrum emissions. In one embodiment, the detector can be an infrared or near-infrared photo-detector or photocell, which captures IR or near-IR emissions from a given object or any IR heat-emitting source. In other embodiments, the detector can be photo-detector for detecting UV, white light, or any other portion of the EM spectrum. The middle component consists of a similarly nano-pixel electrochemical capacitor which is charged by the electric field generated by the photo-detector. The capacitor's charge is then used to power the inner component, which is an EM emitting device, such as, for example, a visible or white light emitting diode made of a similar nano-pixel architecture to that of the photo-detector and the capacitor. In one embodiment, the components are conical-shaped structures layered within each other.

In one embodiment, all the devices are based on organic materials that allow the transmission of a significant component of the light spectrum. For example, it the case where IR spectrum is being converted to white light, the nano-pixel density of the photo-detector determines image resolution of the IR or near-IR (or heat) emitter, which typically has a wavelength in the 1-1.6 micrometer (mm). This means that each nano-pixel device needs to be of a sub-micron size, which is typically half the wavelength of the IR-emitted wavelength received by the device, and preferably one fourth of the latter. Present organic nano-pixel deposition technology allows for the reliable fabrication of nano-pixels that are below 500 nm (0.5 mm) and down to about 100 nm (0.1 mm). When such nano-pixel devices are configured in an array, the array can yield an excellent resolution capable of producing an exact image of an IR heat-emitting object, human being, animal, etc.

In some embodiments, the three components (photo-detector, capacitor, and EM emitter) of the nano-pixel device can be inter-connected by a thin, semi-transparent, biocompatible material such as silver or gold, and buffered by a dielectric material or a biocompatible solution, such as a saline mixture.

The conical-shaped nano-pixel devices or structures can be arranged in an array to create different photo-detection and EM spectrum transformation devices. For example, in one embodiment, the array of nano-pixel devices can be used to form a contact lens or other similar optic device, which would allow an individual to "see" different light spectrums. For example, a device configured to convert IR to visible light could be used for night vision applications, or a contact could be developed to help transform and focus white light to a more visible form of white light for certain individuals. The proposed device can be modified and adapted for a variety of nano-imaging applications where the photocell can be configured to harness a given light source besides near-IR, such as UV, visible and far-IR light sources. In other embodiments, multiple layers of arrays of the conical nano-pixel devices could be configured to operate like on-off switches similar to transistors to create memory arrays or even data processing devices.

Figure 1A:
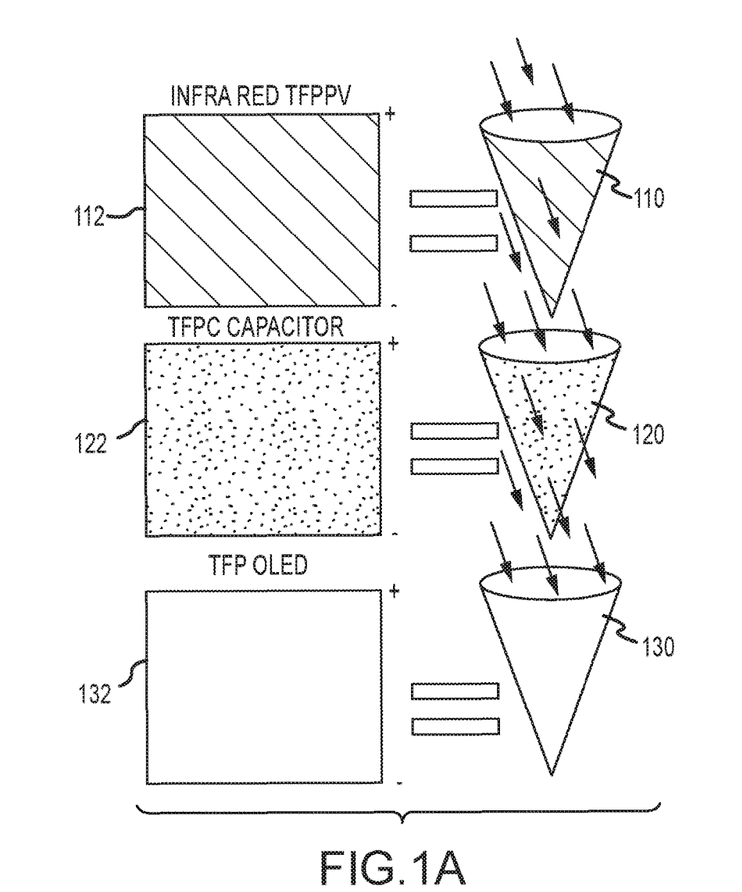
FIG. 1(a) is a schematic drawing showing the different components one embodiment of a conical nano-pixel imaging structure or device in accordance with the present invention.

Referring now to FIG. 1(a), the one embodiment of the present invention is a conical nano-pixel imaging structure or device 100. Imaging device 100 is configured to receive EM spectrum 140 of one form (e.g., IR, UV, white light, etc.) and convert it to a different EM spectrum 150. For example, imaging device 100 can be configured to convert infrared (IR) spectrum (spectrum having a wavelength between about 700 nm and about 1 mm) to visible or white light spectrum (spectrum having a wavelength between about 400 nm and 700 nm). In one particular embodiment, imaging device 100 can be configured to convert near-IR spectrum (spectrum having a wavelength between about 750 nm and about 1.6 µm) to visible light. In this particular embodiment, imaging device 100 can be configured to create miniature night vision devices, such as contact lenses used for night vision. Similarly, and as discussed in more detail below, imaging device 100 can be configured to convert any form of the EM spectrum to any other form for different applications.

Still referring to FIG. 1(a), one embodiment of the conical nano-pixel imaging structure or device 100 comprises a EM spectrum detector 110, a capacitive structure 120, and an EM spectrum emitter 130. EM detector 110 can be any suitable EM detector so long as it can be manufactured from nanomaterials. For example, in the illustrated embodiment, EM detector 110 is a photo voltaic (PV) detector (i.e., photocell) configured to receive or detect IR or near-IR EM wavelengths and generate a forward voltage based upon the detected EM spectrum. In the illustrated embodiment, conical-shaped EM detector 110 is configured from a rectangular-shaped transparent, flexible polymer (TFP) material 112, which consist of organic semiconductors such as fluorophenylthiophenes and fluorenes, manufactured by The Dow Chemical Co., Sigma-Aldrich Corp., or Merck & Co., Inc. While a polyfluorophenylthiophene is but one example of a TFP material that can be used, one skilled in the art will appreciate that TFP material 112 can be any suitable material currently known or hereinafter developed that can be configured to be an EM spectrum detector. For example, there are a number of other oxide thin film nanomaterials that could be used. In addition, non-polymer materials like silicon-based or LCD-type materials could be used. Moreover, while one embodiment of the present invention is described as using a transparent material, the material could also be semi-transparent or even opaque, depending on the particular application of the imaging device. Further, the material does not necessarily have to be flexible. With some applications, a more rigid device could be used. Therefore, the present invention is not limited to the disclosed example.

Capacitive device or capacitor 120 is configured to receive the voltage from EM detector 110, store or buffer the voltage for short time period, and then release the voltage to EM emitter 130 so as to drive the operation of EM emitter 130. In the illustrated embodiment, conical-shaped capacitor 120 is configured from a rectangular-shaped transparent, flexible polymer (TFP) material 122, such as polyethylenedioxythiophene, manufactured by Sigma-Aldrich Corp. While polyethylenedioxythiophene is but one example of a TFP material that can be used for capacitor 120, one skilled in the art will appreciate that TFP material 122 can be any suitable material currently known or hereinafter developed that can be configured to be a capacitor. For example, there are a number of other oxide thin film nanomaterials that could be used. In addition, non-polymer materials like silicon-based or LCD-type materials could be used. Moreover, while one embodiment of the present invention is described as using a transparent material, the material could also be semi-transparent or even opaque, depending on the particular application of the imaging device. Further, the material does not necessarily have to be flexible. With some applications, a more rigid device could be used. Therefore, the present invention is not limited to the disclosed example.

EM emitter 130 is configured to receive the released voltage from capacitor 120 and generate an EM emission based the received voltage. In one embodiment of the invention, EM conical-shaped EM emitter 130 comprises an organic light emitting diode (OLED) configured from a rectangular-shaped transparent, flexible polymer (TFP) material 132, such as polyphenylenevinylenes, manufactured by Sigma-Aldrich Corp. While polyphenylenevinylene is but one example of a TFP material that can be used for EM emitter 130, one skilled in the art will appreciate that TFP material 132 can be any suitable material currently known or hereinafter developed that can be configured to be an EM emitter. For example, there are a number of other oxide thin film nanomaterials that could be used. In addition, non-polymer materials like silicon-based or LCD-type materials could be used. Moreover, while one embodiment of the present invention is described as using a transparent material, the material could also be semi-transparent or even opaque, depending on the particular application of the imaging device. Further, the material does not necessarily have to be flexible. With some applications, a more rigid device could be used. Therefore, the present invention is not limited to the disclosed example. Further, while the illustrated embodiment shows EM emitter 130 being and OLED emitting visible light, one skilled in the art will appreciate that EM emitter 130 can be any type of emitter that can emit EM spectrum. For example, EM emitter 130 can be configured to emit UV or IR spectrum (or any other spectrum for that matter), as well.

Figure 1B:
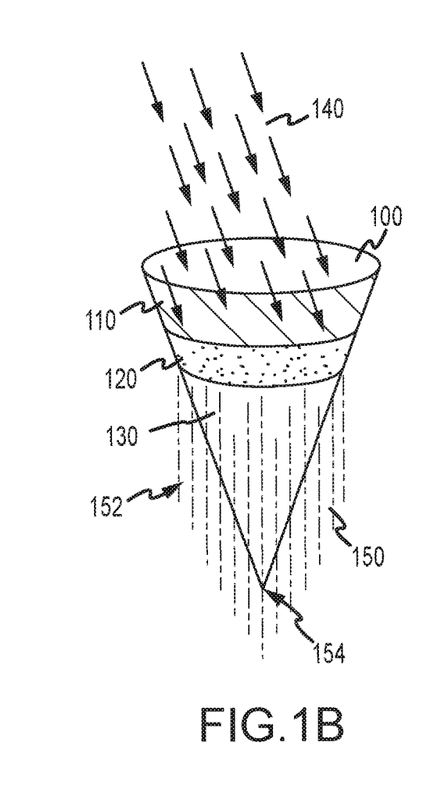
FIG. 1(b) is a schematic drawing showing the components of FIG. 1(a) in one embodiment of an assembled state.
Figure 2:
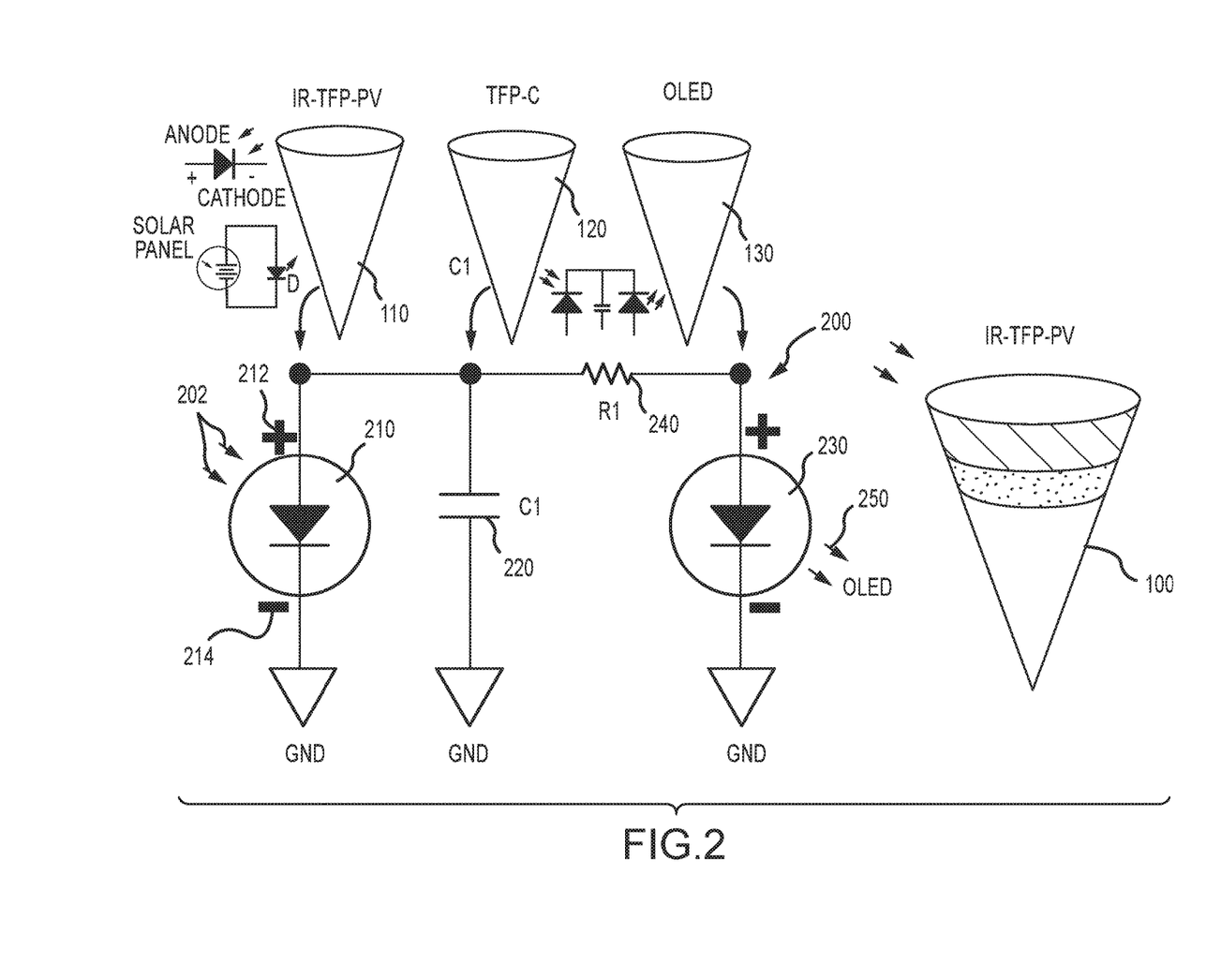
FIG. 2 is a circuit diagram showing the electrical characteristics of the nano-pixel imaging structure or device of FIG. 1, including the electrical characteristics of the different components of the imaging structure.

As illustrated in FIG. 1(b), conical nano-pixel imaging structure or device 100 comprises three concentric conical components formed within each other. That is, in the illustrated embodiment, conical-shaped EM detector 110 is the inner-most structure of device 100, and is formed within conical-shaped capacitor 120. Finally, EM emitter 130 is the outer-most structure of device 100, such that EM detector 110 and capacitor 120 are formed within EM emitter 130. In one embodiment, the three components (EM detector 110, capacitor 120, and EM emitter 130) of the nano-pixel device 100 are inter-connected by a thin, semi-transparent, biocompatible material such as silver or gold, and buffered by a dielectric material or a biocompatible solution, such as a saline mixture. In other embodiments, no inner-connecting material is used. In these embodiments, EM detector 110 is formed next to capacitor 120, which is formed next to EM emitter 130 with not material in between the components. As illustrated in FIG. 1(b), the three components 110, 120 and 130 can be different heights, which in some embodiments could be the case. In other embodiments, however, the height of components 110, 120 and 130 are the same or close to the same as is illustrated in FIG. 2. Further, as one skilled in the art will appreciate, the size, scale and thickness of each of the components 110, 120 and 130 can be varied to accomplish different goals and outputs.

During operation, nano-pixel imaging device 100 receives EM spectrum or energy 140 from a source and converts that spectrum to a different or enhanced EM spectrum 150 for output. As illustrated, the output spectrum 150 can include an emission 152 that emanates from the sides of imaging device 100, and a more concentrated emission 154 that emanates from bottom tip of the conical device. As discussed in more detail below, this allows for the sharing of emissions 152 between multiple devices 100 when such devices are configured in an array structure, as well as focused emission 154 for use in imaging applications.

Referring now to FIG. 2, a circuit diagram 200 illustrates the electrical circuit characteristics of conical nano-pixel imaging structure or device 100. EM detector 210 (e.g., a photo-detector) corresponds to conical-shaped EM detector 110. Similarly, capacitor 220 corresponds to conical-shaped capacitor 120, and EM emitter 230 corresponds to conical-shaped EM emitter 130. In the illustrated embodiment, the circuit structure shown in diagram 200, has EM detector 210, capacitor 220 and EM emitter 230 is a parallel circuit structure with a resistance 240 formed between capacitor 220 and EM emitter 230. Resistance 240 is created by the formation of imaging device 100. In some embodiments, the resistance 240 can be created by the material used for each of the components 120 and 130, the way the capacitor 120 and emitter 130 are bonded together, or alternatively, in other embodiments, the resistance 240 could be created by a material interposed between capacitor 120 and emitter 130. As discussed above, the material can be thin, semi-transparent, biocompatible material such as silver or gold, and buffered by a dielectric material or a biocompatible solution, such as a saline mixture.

As illustrated in FIG. 2, during operation, conical nano-pixel imaging structure or device 100 receives EM spectrum 202 from a source, and EM detector 210 generates a voltage across capacitor 220. The voltage is illustrated in diagram

200 by the positive sign 212 and negative sign 214 across detector 210. As one skilled in the art will appreciate, capacitor 220 stores the voltage until it has built-up enough charge for the capacitor to release it. At such time, capacitor 220 will drive EM emitter 230 through resistor 240. Resistor 240 can be configured to control the intensity of the output 250 of EM emitter 230. For example, if multiple imaging structures are configured in an array as a contact lens device, one would want to control the output such that it would not be so intense as to harm the eye. Similarly, in other applications, one might desire a greater output, for example for data processing applications or the like. Further, as discussed below with reference to FIG. 3, while the nano-pixel device 100 described with reference to FIGS. 1 and 2 have the EM detector 110 as the inner-most device and the EM transmitter 130 as the outer-most device, those components can be switched so that the EM detector 110 is the outer-most device and the EM emitter 130 is the inner-most device, with the capacitor 120 still between the two. In that particular embodiment, EM detector 110 on the outer part of device 100 receives EM spectrum or energy, EM emitter 130 outputs EM spectrum or energy out of or from the open circular mouth of conical device 100. The application of this will be described in more detail below with reference to FIG. 3.

Figure 3:
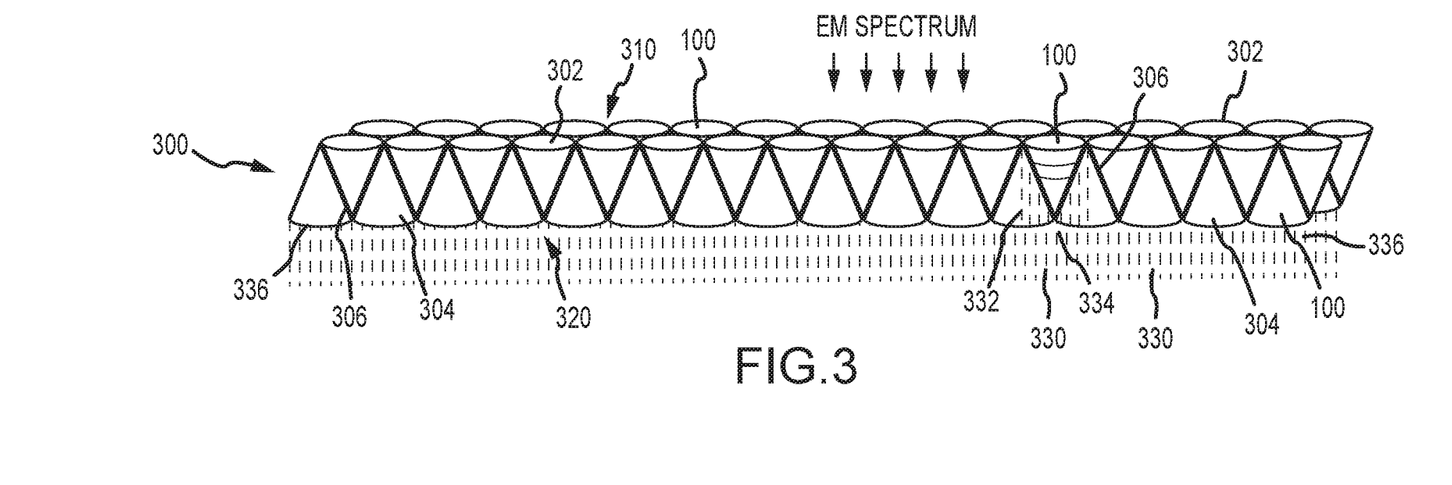
FIG. 3 is a schematic drawing showing an array of nano-pixel imaging structures arranged to form an exemplary imaging or data processing device.
Figure 4:
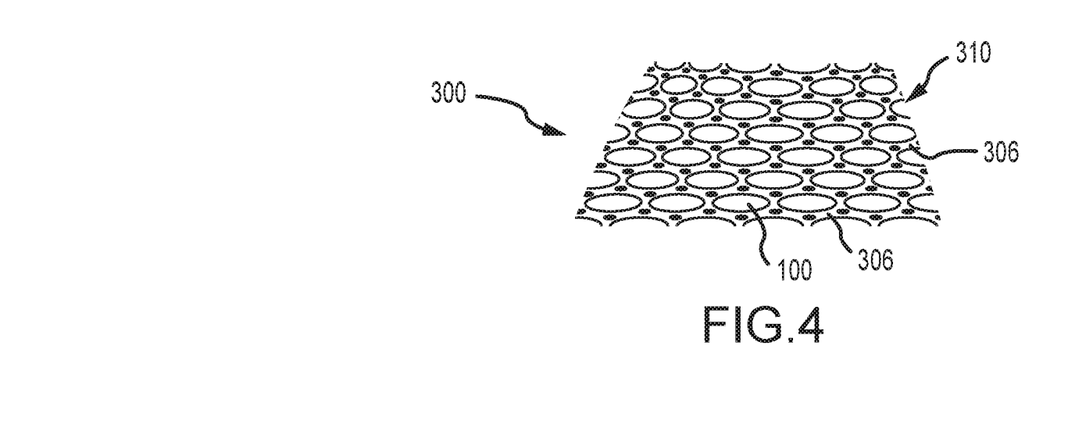
FIG. 4 is a plan view of the array of FIG. 3.

As discussed previously, a plurality of the conical nano-pixel imaging devices 100 can be configured in an array to create different imaging and/or data processing devices. Referring now to FIG. 3, an array 300 of conical nano-pixel imaging devices 100 is illustrated. In the illustrated embodiment, array 300 comprises a plurality of upward-facing nano-pixel imaging devices 302 interleaved in an alternating pattern with downward-facing nano-pixel imaging devices 304. In one embodiment, the upward-facing devices 302 are held in position next to downward-facing devices 304 using a transparent, flexible polymer material 306, such as, for example, aromatic compounds like fluorophenylthiophenes and fluorenes manufactured by Merck & Co., Inc. or The Dow Chemical Company. In some embodiments, material 306 can be a non-conductive dielectric material to help prevent the individual imaging devices 100 from electrically interacting with each other, even though they could still interact with each other via the EM spectrum emissions. In embodiments where the array of nano-pixel devices is used to create bio-mechanical or bio-medical device, such as a contact lens, material 306 will be a biocompatible material which is safe for use in or with the human body. As one skilled in the art will appreciate, other materials also can be used. FIG. 4 is a plan view of array 300 showing material 306 between each of the nano-pixel devices 100.

In other embodiments, instead of material 306 being formed or positioned between each of the individual imaging devices 100, the contact lens can be formed by using a material 306 as the outer most layer of the contact lens holding the imaging devices 100 together, and in some embodiments, providing a common dielectric interface for all devices 100. In this embodiment, material 306 is not necessarily between each of the devices 100, but instead, material 306 forms the outer, top portion of the contact lens, and thus holding the devices or structures 100 together. In accordance with one embodiment, this outer layer of material 306 is configured to allow EM spectrum to pass through. Further, in this particular embodiment, the inner portion of the contact lens (i.e., the portion that goes close to the eye) has a saline or other biocompatible material layer positioned thereon, which in some cases can also act as a common ground for each of the nano-imaging structures 100.

Referring again to FIG. 3, functionality of array 300, and in particular, the interaction of the nano-pixel devices 100 will be described. As illustrated in FIG. 3, array 300 has a top or outer surface 310 formed by the larger circular portion of the upward-facing nano-pixel devices 302. In one embodiment, the point of the downward-facing nano-pixel devices 304 is exposed and also helps form top or outer surface 310. In other embodiments, material 306 can cover the point of downward-facing devices 304, such that they are not an active portion of the array. Similarly, a bottom or inner surface 320 of array 300 is formed by the larger circular portion of the downward-facing nano-pixel devices 304. Again, the point of the upward-facing nano-pixel devices 302 can exposed, so that it helps form bottom or inner surface 320, and is an active portion of the device, or the point can be covered, for example, by material 306, such that they are not an active portion of the device.

During operation, the inner portion of the upward-facing nano-pixel devices 302 (and in some embodiments the tip portion of the downward-facing nano-pixel devices 304) of array 300 receive EM spectrum or energy from a source and converts that spectrum to a different or enhanced EM spectrum for output. As discussed above with reference to FIG. 1 above, the output spectrum from each of the upward-facing nano-pixel devices 302 can include an emission 332 that emanates from the sides of the nano-pixel device, and a more concentrated emission 334 that emanates from bottom tip of the device. Emission 332 can be received by downward-facing nano-pixel devices 304 using an EM detector as the outer-most layer of devices 304, and then downward-facing nano-pixel devices 304 can convert received emission 332 into a different or enhanced spectrum emission 336 which is then output from the circular portion of the downward-facing nano-pixel devices 304. In this regard, in this particular embodiment, the EM emission from lower or inner surface 320 comprises emission 334 from upward-facing nano-pixel devices 302 and emission 336 from downward-facing nano-pixel devices 304. In some embodiments, some or all emission 332 from upward-facing nano-pixel devices 302 can be also be part of the output from bottom or inner portion 320 of array 300. Moreover, in some embodiments, different sized conical nano-pixel devices 100 can be used or positioned in different areas of the array 300. By doing this, different parts of the array can emit and/or focus different wavelengths of energy at different spots. Thus, array 300 can be configured to show depth and differences between background images and images in the field. For example, in some configurations, array 300 might show a background object as one color or emission (including perhaps non-light), and objects in the field with different IR emissions as different colors. In accordance with this aspect of the invention, a device could be created to "see" certain devices or objects that absorb energy from a body; e.g., see a weapon or other object underneath clothing. By using the background and field effects, as well as different focal points and EM emission coloring, 3D imaging devices and/or displays can be created. In this regard, one skilled in the art will appreciate that array 300 can be configured to generate different outputs in wavelength, intensity, focal points, etc. for different applications and uses.

EXAMPLE APPLICATIONS

Arrays of nano-pixel imaging devices 100 can be configured for a number of different applications and uses. For example, in one embodiment, an array of nano-pixel imaging devices 100 can be used to form a contact lens or other similar optic device, which would allow an individual to "see" different light spectrums. For example, a device configured to convert IR or near-IR spectrum to visible light could be used for night vision applications, or the like.

In yet other embodiments, an array of nano-pixel imaging devices 100 can be modified and adapted for a variety of nano-imaging applications with the key component being the photocell whose components can be modified to harness a given light source besides near-IR such as UV, visible and far-IR spectrum. For example, a contact could be developed to help transform and focus white light to a more visible form for certain individuals, thus perhaps aiding ones vision in certain ways. Further, photocell detector (EM detector 110) can be configured to detect UV spectrum and be used to create a contact lens-type device that can convert UV spectrum to visible light, for example, for investigators to aid in the discovery of occult blood at crime scenes, or the like. In yet another embodiment, an array of nano-pixel imaging devices 100 can be used in chemical spectrographic analyses applications. In still other embodiment, a contact lens or other device could be created and used to help surgeons during surgery. For example, because certain body tissue will radiate different EM emissions depending on the type of tissue, the amount of blood in the tissue, or even the amount of oxygen or other elements in the blood, surgeons could use the contact lens device (or similar type device) of the present invention to determine which tissue to focus on (or not focus on) during surgery.

In yet other embodiments, multiple layers of arrays of the conical nano-pixel devices 100 could be configured to operate like on-off switches similar to transistors to create data processing devices or digital memory arrays. One could stack multiple arrays to create mass arrays of processors and/or storage, where for example, photons can be used as the trigger for the processing or storage of data.

In yet another embodiment, arrays of nano-pixel devices 100 can be configured as a solar sail for solar powered satellites. By using these nano-devices, very light weight solar panels or sails can be created to absorb sun light and convert that energy to electric power. Solar panels are clearly known in the art, but the benefit of this type of device is that massive light weight arrays can be created.

In yet other embodiments, multiple layers of arrays of the conical nano-pixel devices 100 could be configured in a spherical or semi-spherical shape to create a lenticular holographic data processor by configuring them in a way to create optical transistors that are multiplexed together into control strings that amplify signals and guide light through a central source. This would provide for room temperature computer processors, storage and switching applications. In yet other embodiments, these layers could be configured in cylindrical shapes to provide for unique volumetric displays for use in applications such as 3-dimensional radar systems.

CONCLUSION

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

Although the embodiments have been described with reference to certain nanomaterials used to create the nano-imaging structures, it is contemplated that any number of different materials could be used, and thus the present invention is not limited to only the materials recited herein.

What is claimed is:

1. An imaging device configured to convert a first electromagnetic spectrum to a second electromagnetic spectrum comprising:
    a conical-shaped electromagnetic spectrum detector formed from a thin film polymer material and operable to receive the first electromagnetic spectrum and generate a voltage;
    a conical-shaped capacitor formed from a thin film polymer material and disposed next to the detector, the capacitor operable to receive the generated voltage from the detector, store the voltage for a brief period of time and then release the stored voltage; and
    a conical-shaped electromagnetic spectrum emitter formed from a thin film polymer material and disposed next to the capacitor, the emitter operable to receive the stored voltage from the capacitor and generate the second electromagnetic spectrum in response to the received voltage.

2. The imaging device of claim 1, wherein the imaging device is configured to convert IR or near-IR spectrum to visible light spectrum.

3. The imaging device of claim 1, wherein the imaging device is configured to convert UV spectrum to visible light spectrum.

4. The imaging device of claim 1, wherein the conical-shaped detector, capacitor, and emitter are configured within each other, with the capacitor configured within the emitter, and the detector configured within the capacitor.

5. The imaging device of claim 1, wherein the conical-shaped detector, capacitor, and emitter are configured within each other, with the capacitor configured within the detector, and the emitter configured within the capacitor.

6. The imaging device of claim 1, wherein the electromagnetic spectrum detector is an IR or near-IR spectrum photo detector.

7. The imaging device of claim 1, wherein the electromagnetic spectrum detector is an UV spectrum photo detector.

8. The imaging device of claim 1, wherein the electromagnetic spectrum emitter is an organic light emitting diode.

9. The imaging device of claim 1, wherein the electromagnetic spectrum detector is an IR or near-IR spectrum photo detector.

10. The imaging device of claim 1, wherein the electromagnetic spectrum detector is an UV spectrum photo detector.

11. The imaging device of claim 1, wherein the electromagnetic spectrum emitter is an organic light emitting diode.

12. An imaging device configured to convert a first electromagnetic spectrum to a second electromagnetic spectrum comprising:
    an array of conical-shaped imaging structures, each imaging structure comprising;
        a conical-shaped electromagnetic spectrum detector formed from a thin film polymer material and operable to receive the first electromagnetic spectrum and generate a voltage;
        a conical-shaped capacitor formed from a thin film polymer material and disposed next to the detector, the capacitor operable to receive the generated voltage from the detector, store the voltage for a brief period of time and then release the stored voltage; and a conical-shaped electromagnetic spectrum emitter formed from a thin film polymer material and disposed next to the capacitor, the emitter operable to receive the stored voltage from the capacitor and generate the second electromagnetic spectrum in response to the received voltage.

13. The imaging device of claim 12, wherein the conical-shaped detector, capacitor, and emitter are configured within each other.

14. The imaging device of claim 13, wherein the capacitor is configured within the emitter, and the detector is configured within the capacitor.

15. The imaging device of claim 13, wherein the capacitor is configured within the detector, and the emitter is configured within the capacitor.

16. The imaging device of claim 13, wherein the array of imaging structures is formed by interleaving upward-facing and downward-facing conical-shaped imaging structures in an alternating pattern.

17. The imaging device of claim 16, wherein the array of imaging structures further comprises the interleaved upward-facing and downward facing conical-shaped imaging structures being held together by a dielectric material disposed between each of the upward-facing and downward-facing conical shaped imaging structures.

18. The imaging device of claim 16, wherein:
the upward-facing conical-shaped imaging structures are configured with the capacitor being within the emitter, and the detector being within the capacitor, the upward-facing conical-shaped imaging structures operable to receive the first electromagnetic spectrum and convert it to an intermediate electromagnetic spectrum; and the downward-facing conical-shaped imaging structures are configured with the capacitor being within the detector, and the emitter being within the capacitor, the downward-facing conical-shaped imaging structures operable to receive the intermediate electromagnetic spectrum from the upward-facing conical-shaped imaging structures and convert it to the second electromagnetic spectrum.

19. The imaging device of claim 16, wherein the array of imaging structures is configured to form a contact lens device.

20. The imaging device of claim 19, wherein the contact lens device is configured to convert infrared spectrum to visible light spectrum to create a night vision contact lens device.

21. The imaging device of claim 19, wherein the contact lens device is configured to convert ultraviolet spectrum to visible light spectrum.

22. The imaging device of claim 13, wherein the array of imaging structures is configured to form a contact lens device.

23. The imaging device of claim 22, wherein the contact lens device is configured to convert infrared spectrum to visible light spectrum to create a night vision contact lens device.

24. The imaging device of claim 22, wherein the contact lens device is configured to convert ultraviolet spectrum to visible light spectrum.

* * * * *